March 31, 1931.  E. MATTERN  1,798,615
BLOW-OUT ANNOUNCER
Filed Nov. 13, 1929
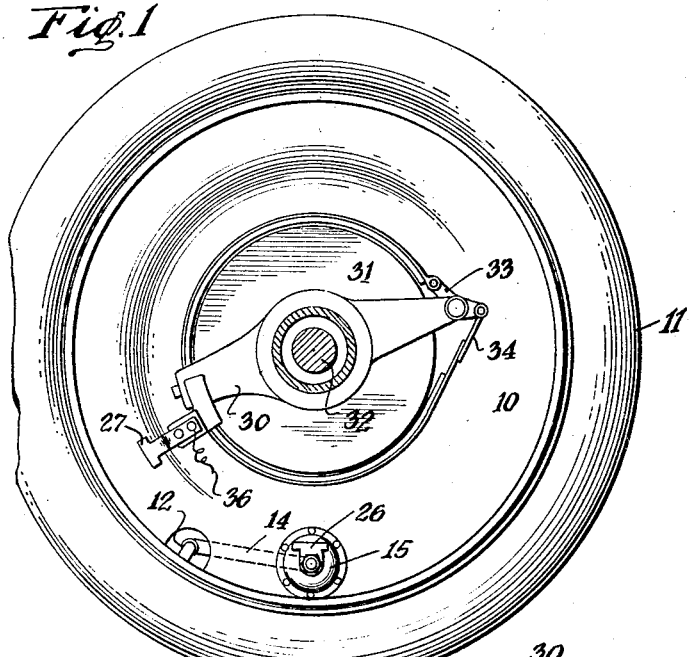
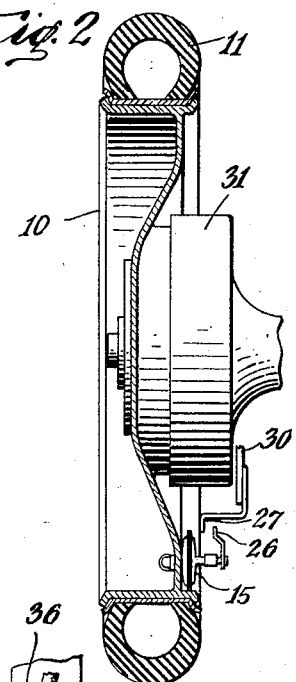
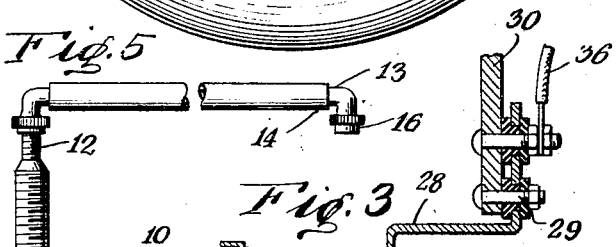
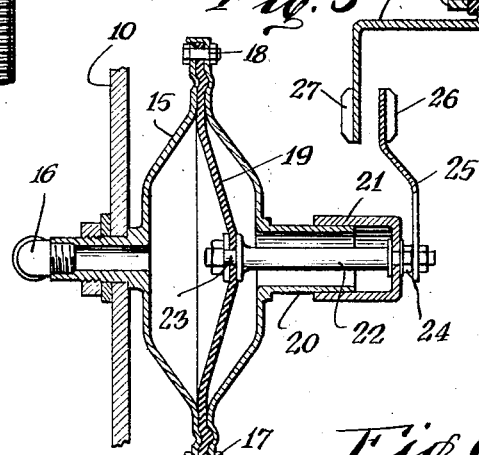
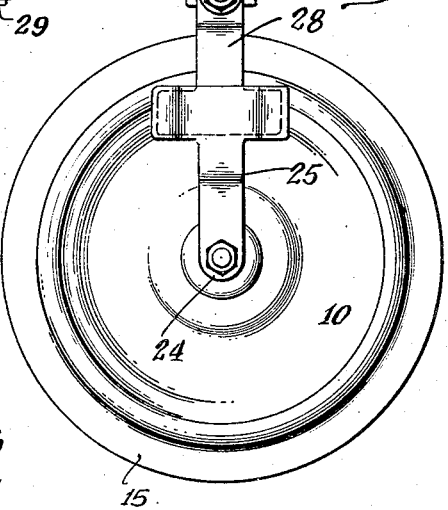
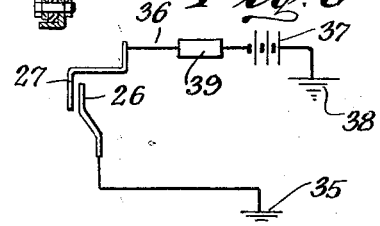
INVENTOR
Ernst Mattern
BY
ATTORNEY Patented Mar. 31, 1931

1,798,615

UNITED STATES PATENT OFFICE

ERNST MATTERN, OF SOUTH JAMAICA, NEW YORK

BLOW-OUT ANNOUNCER

Application filed November 13, 1929. Serial No. 406,737.

This invention relates to improvements in announcers, particularly to a blow-out announcer for automobile-tires, and it is the principal object of my invention to provide such an announcer of comparatively simple and therefore inexpensive construction, which may readily be attached to any of the automobiles at present in use without necessitating material changes, which, however, is durable and efficient in operation.

It is well known that especially on smooth roads the driver paying attention to the traffic and signals does not become aware of the occurrence of a blow-out which is especially dangerous on slippery roads and which is injurious to the automobile if not remedied at once.

My invention overcomes this disadvantage by closing a circuit in which a band brake is located as soon as a blow-out occurs for stopping the car.

Another object of my invention is the provision of a blow-out announcer positively operating by the rebound of a diaphragm in connection with a contact closer as soon as the air within a tire, which normally holds the diaphragm bent and the circuit open, becomes exhausted, so that a band brake is operated to stop the car.

These and other objects of my invention will become more fully known as the description thereof proceeds, and will then be specifically defined in the appended claims.

In the accompanying drawing, forming a material part of this disclosure:

Fig. 1 is a side elevation of a wheel equipped with a blow-out announcer and brake constructed according to my invention.

Fig. 2 is a sectional end elevation thereof.

Fig. 3 is a sectional side elevation of announcer and contact maker on an enlarged scale.

Fig. 4 is a front elevation thereof.

Fig. 5 is a detail view of a connecting member between air valve nipple and announcer housing.

Fig. 6 is a diagrammatic view of the electric circuit according to my invention.

As illustrated, a wheel 10 equipped with tire 11 and air valve nipple 12 of any well known suitable construction, has this nipple connected by means of a tube 13 extending through a sleeve 14 to a housing 15 of the announcer by means of its threaded elbow 16.

The housing 15 is composed of two homogenous halves supplementing each other and connected by means of bolts 17, 18 passing through the flanges of the housing parts. Between these flanges the ends of a diaphragm 19 made of rubber or the like and arranged within the housing are held in place by the bolts 17, 18.

The outer half of the housing carries a socket 20, the outer end of which is covered by a cap 21, and a bolt 22 extends horizontally through cap and socket into the housing where it is secured at its inner end, as indicated at 23, to the center part of diaphragm 19. The outer end of bolt 22, outside of the cap 21, has attached thereto by means of nuts 24 or the like, a curved upstanding arm 25 carrying a contact plate 26 at its upper end. This contact plate 26 is adapted to make contact with a similar contact plate 27 at the lower end of an angular arm 28 attached at its upper end by bolts 29 to a brake arm 30 on the hub 31 for the wheel shaft 32.

To the opposite end of arm 30 is pivotally attached a bell-crank lever 33 to which the ends of a band brake 34 are secured.

The contact plate 26 is grounded as at 35, while a cable 36, attached to one of bolts 29 connects contact plate 27 with one pole of a battery 37, the other pole of which is grounded, as at 38. A brake releasing gun of well known construction within a housing 39 is provided in the connection between battery 37 and contact plates 26 and 27.

The device operates as follows:

Upon occurrence of a blow-out the diaphragm 19 which is normally held by the air pressure in the tire in the position illustrated in Figure 3 with contacts 26 and 27, held apart, will snap inwardly and draw bolt 22 also inwardly so as to close the brake circuit over contacts 26, 27, to actuate the band brake to announce to the driver a blow-out, and avoid slipping on wet roads, etc.

It will be understood that I have described and shown the preferred form of my invention only and that I may make such changes therein as come within the scope of the appended claims without departure from my invention.

Having thus described my invention what I claim as new and desire to secure by Letters Patent is:

1. A blow-out announcer comprising a band brake, a circuit in which said brake is located, means for normally keeping said circuit open and said brake idle, and a means for closing said circuit to operate the brake as soon as a blow out occurs.

2. A blow-out announcer comprising a band brake, a circuit in which said band brake is located, a housing on the wheel, a connection between said housing and the air nipple of the wheel, a contact closer, and means for normally keeping said contact closer inoperative but allowing an operation of the same to close the brake circuit as soon as a blow-out is experienced.

3. A blow-out announcer for automobile tires comprising a band-brake for the wheel, a circuit in which said band brake is located, a housing on said wheel, a connection between said housing and the air nipple of the tire, a pair of circuit closing contacts, means in said housing for normally keeping said contacts apart but allowing an engagement of said contacts for closing the brake circuit upon the occurrence of a blow-out.

4. In a blow-out announcer of the class described a housing adapted to be secured to a wheel, a diaphragm held in said housing, connections between said housing and the air nipple of the wheel for normally holding said diaphragm bent, a contact closer connected with said diaphragm normally held in inoperative position, but adapted to become operative to close a brake circuit upon the rebound of the diaphragm as soon as the air in the tire becomes exhausted through a blow-out.

5. In a blow-out announcer of the class described the combination of a band brake with electrically controlled means for operating the same by a blow-out, said means comprising a housing secured to a wheel, a connection between said housing and the air nipple of a tire on said wheel, a diaphragm in said casing normally held in bent position by the air pressure prevailing in the tire, a bolt to which said diaphragm is attached, a circuit closing plate connected to said bolt, and a circuit closing plate connected to the brake, said diaphragm rebounding upon the failing of the air pressure and drawing said bolt inwardly to engage said circuit closing plates to close the brake circuit.

In witness whereof I have signed my name to this specification.

ERNST MATTERN.